L. A. THORNBURG.
SAFETY MECHANISM FOR AUTOMATICALLY APPLYING AIR BRAKES.
APPLICATION FILED SEPT. 24, 1917.

1,265,974.

Patented May 14, 1918.
3 SHEETS—SHEET 1.

Inventor
L. A. Thornburg

Witness

By

Attorney

L. A. THORNBURG.
SAFETY MECHANISM FOR AUTOMATICALLY APPLYING AIR BRAKES.
APPLICATION FILED SEPT. 24, 1917.

1,265,974.

Patented May 14, 1918.

Witness
J. Gordon Parker

Inventor
L. A. Thornburg
By
Attorney

L. A. THORNBURG.
SAFETY MECHANISM FOR AUTOMATICALLY APPLYING AIR BRAKES.
APPLICATION FILED SEPT. 24, 1917.
1,265,974.
Patented May 14, 1918.
3 SHEETS—SHEET 3.
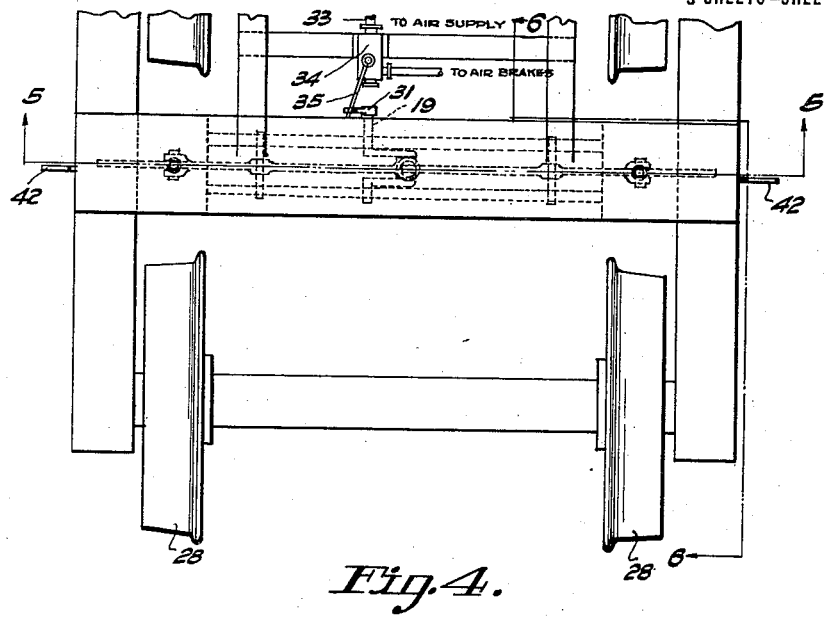
Fig. 4.
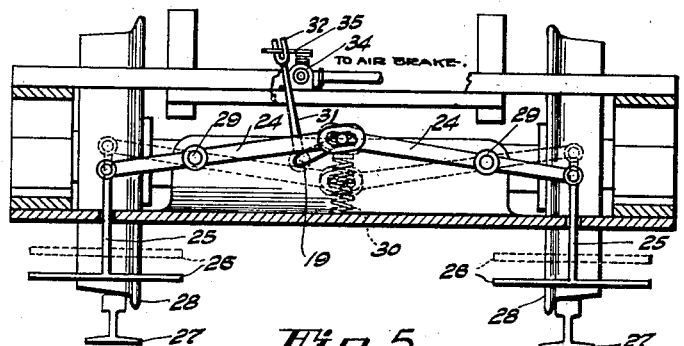
Fig. 5.
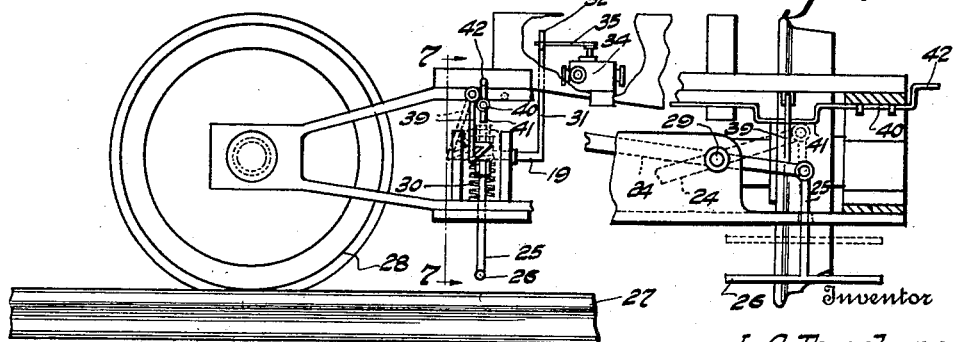
Fig. 6.  Fig. 7.
Witness
J. Gordon Sparkes
Inventor
L. A. Thornburg
By 
Attorney

UNITED STATES PATENT OFFICE.

LEE A. THORNBURG, OF ODENVILLE, ALABAMA, ASSIGNOR OF ONE-FOURTH TO T. A. LAMBERT, OF ODENVILLE, ALABAMA.

SAFETY MECHANISM FOR AUTOMATICALLY APPLYING AIR-BRAKES.

1,265,974.      Specification of Letters Patent.      Patented May 14, 1918.

Application filed September 24, 1917. Serial No. 192,957.

*To all whom it may concern:*

Be it known that I, LEE ALBERT THORNBURG, a citizen of the United States of America, residing at Odenville, in the county of St. Clair and State of Alabama, have invented certain new and useful Improvements in Safety Mechanism for Automatically Applying Air-Brakes, of which the following is a specification.

This invention relates to a mechanism for automatically effecting the application of air brakes throughout a train upon the derailment of any of the car or locomotive trucks.

It is more particularly the object of my invention to make use of electro-mechanical appliances by means of which the derailment of any truck in a train will cause the immediate application of all the air brakes of the train, and to this end I provide each truck of the cars and locomotive with a mechanism adapted to be operated by engagement with the rail when its respective truck is derailed and, by its operation, to energize a normally open circuit extending the full length of the train and including therein for the locomotive and for each car an electromagnet or solenoid adapted when energized to open a valve in the air brake system and cause the brakes to be applied.

My invention also contemplates the utilization of the present lighting circuits of the train as the source of electrical supply, branch circuits leading therefrom to each automatic truck switch which stands normally open. Each of these branch circuits is also provided with an independent cut out switch which can be turned by hand to open the circuit to the switch that has been automatically closed and thus deënergize the electro-magnets and reinstate the air brake system to the control of the engineer so that the brakes can be released independently of any manipulation of the automatic truck switches. In order to further use my electric system of brake control, the engineer and brakeman are provided with switches adapted to close the circuit between the lighting line and the solenoid line at any time it may be desired to bring the train to rest under emergency conditions or otherwise and independently of the automatic derail mechanism.

My invention also comprises the various novel details of construction which in their preferred embodiment only are illustrated in the accompanying drawings, in which:—

Fig. 4 is a partial plan view of a truck equipped with a modification of my invention adapted to mechanically operate the air brake control valve.

Figure 1:
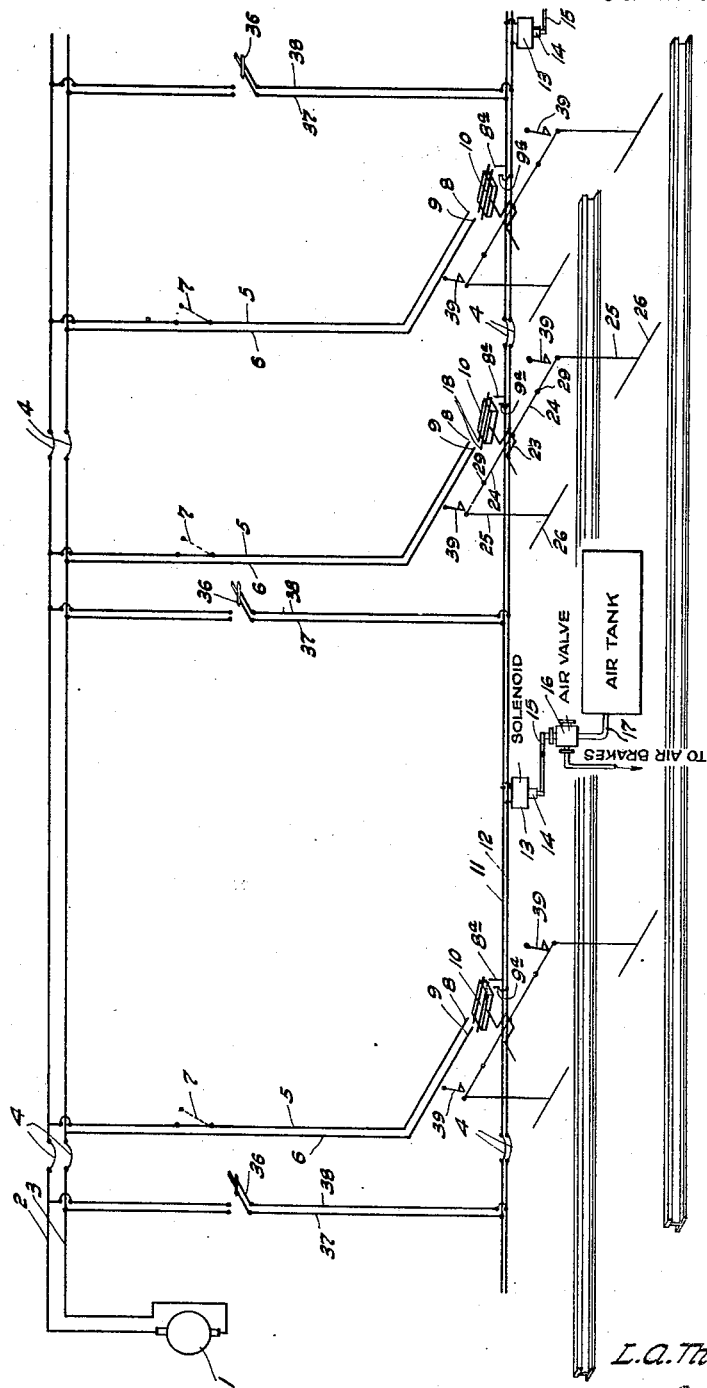
Figure 1 is a diagrammatic illustration of the circuits and automatic truck switches as adapted for operation in accordance with my invention.

Figs. 5 and 6 are sectional views taken on the lines 5—5 and 6—6 of Fig. 4.

Fig. 7 is a sectional view taken on the line 7—7 of Fig. 6.

Similar reference numerals refer to similar parts throughout the drawings.

I have illustrated my invention in connection with a train wiring system of standard design, comprising an auxiliary generating unit 1 which supplies current to the wires 2 and 3 forming the main supply circuit for the train and being connected between cars by flexible couplings 4. On the locomotive and on any one or all of the cars I lead from the main supply circuit a branch circuit for each automatic truck switch formed by the wires 5 and 6, the wire 5 being connected to the main circuit wire 2 and the wire 6 to the main circuit wire 3. A suitable cut out switch 7 is provided in each branch circuit. These wires 5 and 6 lead respectively to switch terminals 8 and 9. An automatic truck switch 10 is adapted to close each branch circuit 8, 9 by wires 8ᵃ and 9ᵃ to the wires 11 and 12 forming the normally open brake control circuit. These wires 11 and 12 are connected continuously throughout the length of the train by flexible couplings 4 between cars and for each car or locomotive I include in the brake control circuit a solenoid or electro-magnet 13 adapted to be energized when the circuit is closed and to move its core 14 to rock a lever 15 sufficiently to open a valve 16 in the air brake system 17 so as to release the pressure to the brake cylinders (not shown) and cause an application of the brakes.

It will be obvious that when any one of the automatic truck switches 10 is moved to closed position, all of the magnets 13 included in the brake control circuit 11, 12, will be closed and all air brakes will be caused to go on simultaneously so as to effect an emergency application of the brakes.

Figure 2:
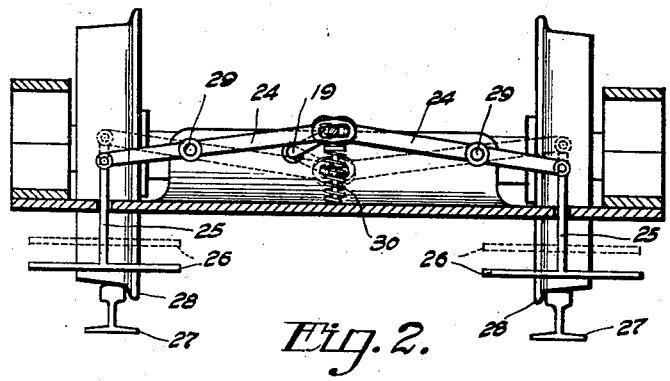
Fig. 2 is a vertical section taken through a truck on the line 2—2 of Fig. 3 with the truck partly broken away to illustrate the automatic operating mechanism for the electric switch.
Figure 3:
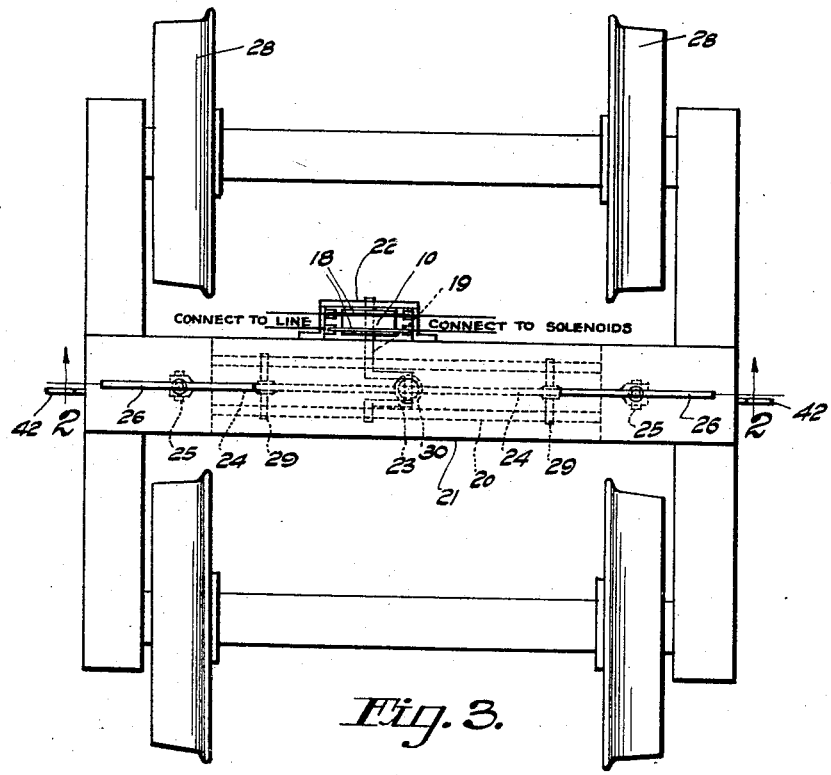
Fig. 3 is a bottom plan view of the truck equipped with my invention.

The automatic truck switches 10 comprise a pair of switch blades 18 mounted upon and suitably insulated from a rocker shaft 19 which is journaled in a suitable frame 20 mounted in or forming part of the bottom central cross member 21 of the truck. The rocker shaft extends through the casing 22, in which the switch blades are mounted, and is bent to form a crank 23 to which I connect the inner ends of a pair of levers 24 fulcrumed at an intermediate point in their length on bearing pins 29 near each end of the frame 20. The outer ends of the levers are each pivotally connected to a rod 25 which projects downwardly through a suitable opening in the truck member 21 and is provided at its lower end with a trip bar 26 of substantial length and disposed transversely with its center normally over a track rail 27. The length of the two trip bars 26 is such that when the wheels 28 of the truck leave the tracks 27, the truck will drop and these trip bars will engage the rails and be forced upwardly thereby to the dotted line position shown in Fig. 2, which movement depresses the inner ends of the fulcrumed levers 24 and rocks the crank shaft 19 in such manner as to move the blades 18 to close the switch 10.

In an emergency under peculiar conditions it might happen that the trip bar 26 would be pressed upward but upon further movement of the truck would be released from contact with the rail and the automatic switch become opened before the brakes have stopped the train. To secure the trip against such return action, I provide a gravity latch 39, Fig. 6, hinged to the truck frame and adapted to catch on the horizontal extension of its head the outer end of the lever 24, and to retain it in raised position. To release these latches on each end of the truck simultaneously, a bar 40 having cranks 41 and an operating hand crank arm 42 is swung from the truck in such manner as to disengage the latches 39 from the trips, when it is desired to release the brakes.

The weight of the trips 26 may be such as to normally hold them in lowered position with the switch open, but if desired a spring 30 may be provided and adapted to act on the crank 23 in such manner as to yieldingly hold the trips in lowered position and the switches 10, in open position.

For control of the brake system for the normal stopping of the train at stations or for an emergency stop before the train is actually derailed, I provide in the cab, convenient to the engineer, and also in any of the cars where it may be desired, a switch 36 set in the line formed by conductors 37 and 38, connecting directly and independently, of the automatic mechanism, the lighting conductors 3 and 2 with the solenoid conductors 11 and 12, respectively.

In Figs. 4 to 6 I illustrate a modification of my invention in which the shaft 19 instead of carrying switch blades is upturned at 31 and provided with a slotted end 32 which as the crank is moved is caused to swing laterally of the truck. 33 is a pipe of the air brake system which extends over the truck and has a valve 34 therein disposed to turn about a vertical axis and having a handle 35 adapted to be received in and project substantially through the slotted end of the crank arm 31. This valve when standing parallel with the center line of the car is in closed position and the air brake system is unaffected thereby, but as soon as the truck is derailed and the trips operated, the crank 23 is rocked and the arm 31 moved to shift the valve to its open position, thereby modifying the functions of the air brake system in the manner well understood in the art to cause the application of the brakes.

Any suitable type of valve may be employed and the operating connections between the crank 23 and the valve may be varied to meet different operating conditions.

In operation, the automatic switches 10 stand normally open, thereby open circuiting the branch circuits 5, 6 and the brake control circuit 11, 12, and this condition continues until due to some accident derailment of a truck bearing an automatic switch occurs, whereupon its respective switch 10 is closed and thereby the whole brake control circuit 11, 12, is energized applying all brakes. As soon as the train has come to rest the cut out switch 7 for the branch circuit, including the automatic truck switch which has been closed by the derailed truck will be opened, thereby opening the brake control circuit 11, 12 and restoring all brakes to the control of the engineer.

It will be understood that the trip mechanism carried by the truck may be utilized in various manners to effect the operation of a valve adapted to apply the brakes. It will also be understood that the derail construction of my invention may be variously modified to meet different operating conditions without departing from the essential features of the invention.

Having thus described my invention, what I claim as new and desire to secure by Letters Patent, is:—

1. An automatic air brake applying apparatus comprising, in combination with an air brake system, an electric train circuit and its source of electric supply, of a normally open train circuit, magnets in said open circuit, mechanism controlled by each magnet to cause the application of the brakes on its respective car, normally open branch circuits connecting said train circuits, and a switch in each branch circuit movable responsive to the derailment of a truck to energize said normally open train circuit and instantly apply the brakes controlled by all magnets in said latter circuit.

2. An automatic air brake applying apparatus comprising, in combination with an air brake system, an electric train circuit and its source of electric supply, of a normally open train circuit, magnets in said open circuit, mechanism controlled by each magnet to cause the application of the brakes on its respective car, normally open branch circuits connecting said train circuits, and a switch in each branch circuit movable responsive to the derailment of a truck to energize said normally open train circuit, and normally open supplemental circuits, connecting said electric train circuit with the train circuit carrying said magnets, and switches in each of said supplemental circuits and instantly apply the brakes controlled by all magnets in said latter circuit.

In testimony whereof I affix my signature.

LEE A. THORNBURG.

Copies of this patent may be obtained for five cents each, by addressing the "Commissioner of Patents, Washington, D. C."